United States Patent [19]

Nashiwa et al.

[11] 4,043,798
[45] Aug. 23, 1977

[54] PROCESS FOR PRODUCING STEEL HAVING IMPROVED LOW TEMPERATURE IMPACT CHARACTERISTICS

[75] Inventors: Hajime Nashiwa; Akiyoshi Mori, both of Wakayama; Makoto Tokuda, Ibaragi, all of Japan

[73] Assignee: Sumitomo Metal Industries Limited, Japan

[21] Appl. No.: 584,501

[22] Filed: June 6, 1975

[30] Foreign Application Priority Data

Sept. 20, 1974  Japan .................................. 49-109339
Oct. 24, 1974   Japan .................................. 49-122927
Nov. 7, 1974    Japan .................................. 49-129421

[51] Int. Cl.² ............................ C21C 7/00; C21C 7/10
[52] U.S. Cl. .............................................. 75/53; 75/49
[58] Field of Search ................................. 75/53, 49

[56] References Cited

U.S. PATENT DOCUMENTS 3,492,114  1/1970  Schneider ............................ 75/53
3,492,118  1/1970  Mickelson ........................... 75/53
3,729,309  4/1973  Kawawa ............................... 75/53
3,871,868  3/1975  Renaud ................................ 75/53

Primary Examiner—Peter D. Rosenberg
Attorney, Agent, or Firm—Watson, Cole, Grindle & Watson

[57] ABSTRACT

Herein disclosed is a process for the addition of calcium to a molten steel which achieves an excellent yield and effect. The process is applied to molten steels having a chemical composition of carbon 0.02 to 0.55%, Silicon less than 0.50%, Manganese 0.20 to 2.50%, sulfur less than 0.010%, total oxygen content less than 100 ppm, quantities of other standard alloying elements and the balance being iron, and being maintained at a temperature of 1480° to 1800° C. The process is conducted either by shooting projectiles which include calcium into the molten steel or by continuously feeding a wire of a calcium containing material into the molten steel in an amount of 0.1 to 2.0 kg per ton of molten steel calculated on the basis of pure calcium so that the calcium content of the resulting steel becomes 0.05 to 0.8 times the sulfur content. The resulting steel has excellent low temperature impact characteristics.

23 Claims, 4 Drawing Figures

PROCESS FOR PRODUCING STEEL HAVING IMPROVED LOW TEMPERATURE IMPACT CHARACTERISTICS

This invention relates to a process for the addition of calcium to molten steel and a calcium additive employed therefor.

For the purpose of improving the cold workability and impact characteristics of steel products, either titanium, zirconium or a rare earth element has been added to the molten steel to clean the steel or nodularate sulfides therein. It has been also known that calcium is effective for cleaning steel or nodularating sulfides. When added to molten steel by usual prior art processes, however, the calcium is largely consumed during the passage through the slag layer on the surface of the molten steel because of its strong reactivity and high vapour pressure at the metallurgical operation temperature. Hence, the addition of calcium to molten steel has not been put into practical operation because it is less effective and less stable than is the addition of cerium and other rare earth elements.

We have found that the yield and effectiveness of the calcium added depend largely on the sulfur and total oxygen contents of the molten steel and, as a result, have developed an improved process for the addition of calcium to molten steels.

It is an object of this invention to provide a practical process for adding calcium to molten steel.

It is another object of this invention to improve the yield and effectiveness of the addition of calcium by reducing the sulfur content, the total oxygen content and impurities by treating the molten steel before the addition of calcium or by modifying the slag.

It is a further object of this invention to provide novel additives for use in adding calcium to the molten steel.

Other objects and features of this invention will be apparent from the following detailed description with reference to the attached drawing, wherein.

Molten steel which is suitable for the application of the process of this invention contains, by weight, carbon 0.02 to 0.55%, silicon less than 0.50%, manganese 0.20 to 2.50% and conventional amounts of typical alloying elements, the balance being iron and an inevitable amount of impurities.

The lower limit of the carbon content is normally 0.02% in commercial steel-making processes. On the other hand, when the carbon content is larger than 0.55%, the effectiveness of the addition of calcium disappears substantially. The stated silicon content falls within the range specified in the JIS and API standards for hot-rolled steel sheet, seamless and welded steel pipe and tube and preferably ranges from 0.04 to 0.40% by weight. Abbreviations "JIS" and "API" as used herein signify, respectively, "Japanese Industrial Standards" and "American Petroleum Institute". The manganese content imparts mechanical strength to the resulting steel but a content thereof higher than 2.50% by weight reduces the effectiveness of the addition of calcium. The manganese is preferably contained in an amount from 0.75 to 1.70% by weight for improvement of impact characteristics. Other alloying elements may be contained in the steel in the following ranges by weight:

Cu: 0 – 0.50%
Cr: 0 – 1.50%
Mo: 0 – 0.50%
Ni: 0 – 10.0%
Nb: 0 – 0.050%
V: 0 – 0.1%
Ti: 0 – 0.05%

In the process of this invention, it is essential to maintain the sulfur content at a value less than 0.010% by weight, preferably less than 0.007%, and the total oxygen content at less than 100 ppm. A sulfur content of higher than 0.010% makes the addition of calcum ineffective and if the suflur content is higher than 0.007%, the addition of calcium is les effective than the addition of cerium for improving the low temperature toughness and impact characteristics of the steel products. However, when the sulfur content is less than 0.007%, the addition of calcium according to this invention exhibits a more significnt effect than he addition of cerium with respect to the above mentioned improvement of the properties of steel products. When the total oxygen content is higher than 100 ppm, the calcium is largely consumed by combination with oxygen due to its strong affinity for the latter. As a result, a sufficient effect can not be expected in cleaning or nodularating sulfides in the molten steel.

At the time of the addition of calcium according to this invention, the temperature of molten steel is maintained in the range of 1480° to 1800° C for the following reason: At a temperature lower than 1480° C, the ingot-making operation becomes difficult and calcium contaminates are not sufficiently able to float up to the surface of the molten steel, thus resulting in dirty steel ingots. On the other hand, if the temperature exceeds 1800° C, the vapour pressure of the molten steel becomes so high that the calcium which has been added is evaporated out before the reaction with the sulfides in the molten steel can occur thereby causing a decrease in the yield from the calcium addition and a prominent loss in ladle refractories by fusion.

According to this invention, calcium is added in an amount ranging from 0.05 to 2.0 kg per ton of molten steel so that the calcium content becomes 0.05 to 0.8 times the sulfur content in the resulting steel product. The addition of calcium in a net amount of less than 0.05 kg/ton of steel is insufficient to clean or nodularate the sulfides which the molten steel contains at a sulfur content of about 0.010%. On the other hand the addition of calcium in a net amount of larger than 2.0 kg/ton of steel esults in a saturation effect and, therefore, the addition of an excessive amount makes the operation uneconomical.

According to this invention, there are provided pretreatments of the molten steel to which calcium is to be added for the purpose of enhancing the yield and effectiveness of the addition of calcium. The pretreatments include vacuum degassing, inert gas bubbling, aluminum deoxidizing and slag modifying processes.

The molten steel is preferably an aluminum killed steel and an acid soluble aluminum content higher than 0.005% by weight is preferable, because the soluble aluminum content decreases the ferrous oxide content of the slag and thus results in a decrease in the consumption of the slag and ladle refractories by oxidation. Further, the addition of calcium desulfurizes the molten steel in the presence of aluminum by forming contaminates of the Ca-Al-O-S system according to the following equation:

$$3CaO + 2Al + 3S = Al_2O_3 + 3CaS.$$

Accordingly, the higher the aluminum concentration is, the lower the sulfur content in the molten steel becomes by the addition of calcium and the more the impact characteristics of the resulting steel products are improved.

When the steel product is specified not to contain aluminum, the molten steel should be subjected to a vacuum degassing process before the addition of calcium to decrease the total oxygen content to less than 100 ppm. The aluminum killed steel may be also subjected to the vacuum degassing process. When aluminum killed steel is vacuum degassed by the DH process, the degassing is preferably carried out under the condition of a final vacuum of less than 0.5 mm Hg in a vacuum degasser and a circulation ratio of higher than 1.5, with the result that the content of active oxygen becomes less than 10 ppm.

According to the present invention, the molten steel is preferably subjected to a bubbling process with an inactive gas, such as argon, to agitate the molten steel so that the remaining contaminates float up. When the molten steel is contained in a ladle of 25 to 300 tons capacity, the inactive gas bubbling process is carried out under the following conditions:

Pressure of inactive gas: 2.5 to 5.0 kg/mm² gauge
Flow rate of inactive gas: 10 to 80 Nm³/hr
Duration time of bubbling: 20 to 40 minutes This inactive gas bubbling process, of course, may be carried out solely or in combination with an aluminum deoxidizing and/or vacuum degassing process.

According to this invention, it is preferable to effect a slag modifying process before the addition of calcium to suppress the formation of highly oxidizing slag. The slag modifying process is carried out by putting an artificial slag in an empty ladle and thereafter pouring molten steel into it. Such an artificial slag is of high basicity and comprises, by weight, lime 40 to 60%, magnesia 7 to 9%, alumina 15 to 25%, silica 3 to 5% and calcium fluoride 20 to 30%. The artificial slag of this composition is prepared from the slag which forms at the final stage of steel refining in an electric furnace.

Figure 1:
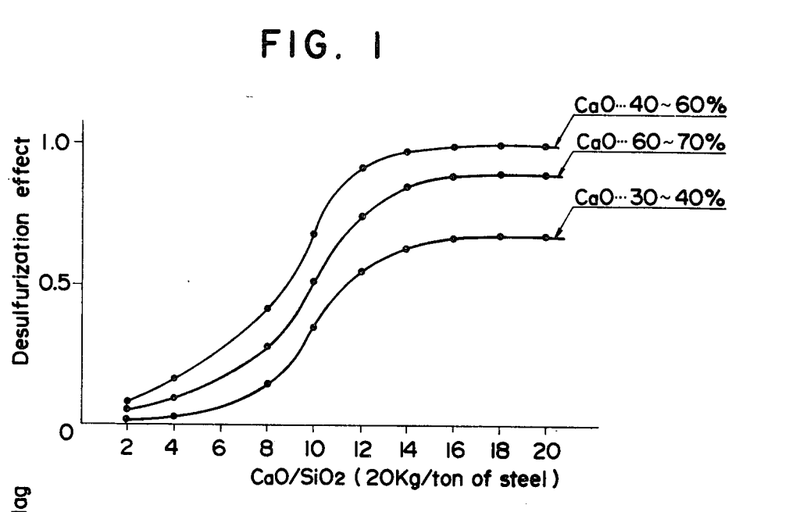
FIG. 1 is a graphical representation of the relationship between the desulfurization effect (the ordinate) and the ratio $CaO/SiO_2$ (the abscissa) of an artificial slag according to this invention, when the artificial slag containing calcium fluoride in the order of 20 to 30% by weight is added to a molten steel in an amount of 20 kg/ton of steel.
Figure 2:
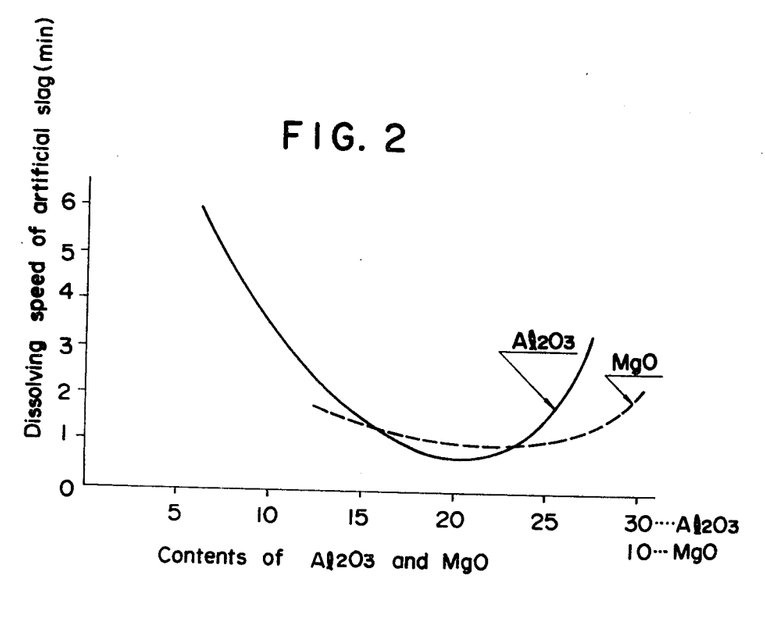
FIG. 2 is a graphical representation of the relationship between the dissolving speed of the artificial slag into the molten steel (the ordinate) and the content of alumina and magnesia in the slag (the abscissa).

As shown in FIG. 1, the desulfurization effect (which is represented by a ratio of the test result to the maximum desulfurization achieved all of the tests) begins to increase at a CaO/SiO₂ ratio of 8 and reaches a maximum at a CaO/SiO₂ ratio of 20. This experiment was conducted while maintaining the content of calcium fluoride at 20 to 30%. The desulfurization effect also reaches a saturation point when the slag contains from 40 to 60% by weight of lime, alumina and magnesia are included to lower the melting point of the artificial slag and the dissolving rate of the slag into the molten steel, as shown in FIG. 2.

It is preferable to control the size distribution of the artificial slag as follows:

| | |
|---|---|
| Larger than 8 mesh | 3 – 17% |
| 8 – 12 mesh | 10 – 16% |
| 12 – 20 mesh | 15 – 20% |
| 20 – 32 mesh | 11 – 22% |
| 32 – 48 mesh | 10 – 30% |
| 48 – 60 mesh | 2 – 5% |
| 60 – 100 mesh | 6 – 8% |
| 100 – 150 mesh | 1 – 5% |
| 150 – 200 mesh | Less than 3% |
| Smaller than 200 mesh | Less than 11% |

Figure 3:
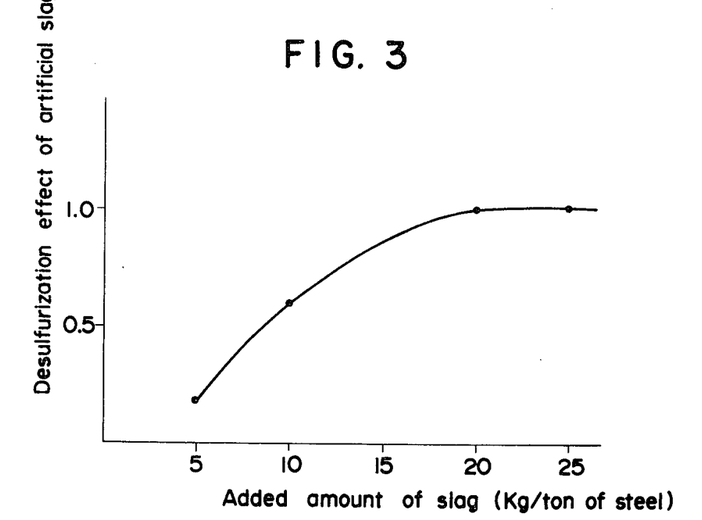
FIG. 3 is a graphical representation of the relationship between the desulfurization effect of the artificial slag (in ordinate) and the added amount of the slag (in abscissa) to molten steel.

The slag modifying process is also effective for the desulfurization of the molten steel and the desulfurization effect becomes significant at an addition of the artificial slag of 5 kg/ton of steel and reaches a saturation point at 20 kg/ton, as shown in FIG. 3. The artificial slag may have a chemical composition of line 55 to 70%, alumina 10 to 25% and calcium fluoride 3 to 14%.

This invention provides a method for the addition of calcium, wherein the calcium is not consumed while passing through the slag layer but at a sufficient depth in molten steel to have the desired effect.

According to a preferred embodiment of this invention, the addition of calcium is carried out by shooting projectiles of a calcium additive at an initial velocity of 20 to 100 m/sec from a launcher into molten steel in a ladle of 25 to 300 tons capacity. Such a ladle is 1 to 7 meters in height. At an initial velocity lower than 20 m/sec, the projectiles of calcium additive cannot penetrate into the molten steel to a sufficient depth, therefore, the projectiles float upwards to the slag layer before being completely dissolved, with the result that the effectiveness and yield of the addition of calcium is decreased. On the other hand, an initial velocity higher than 100 m/sec is unfavorable in the described ladle since the projectile collides against and damage the referactories in the bottom part of the ladle.

The projectiles of calcium additive which is suitable for use in the method described in the above has a diameter of 5 to 100 mm, preferably 25 to 50 mm, a length of 100 to 800 mm and comprises a shell and has a calcium additive contained therein. The shell of the projectile is composed of any one of the following materials:

Aluminum of a thickness—0.5 to 20 mm
Iron of a thickness—0.2 to 15 mm
Copper of a thickness—0.2 to 15 mm
Organic material of a thickness—0.2 to 20 mm
Fire-proof paper of a thickness—1.0 to 20 mm The calcium additives contained in the projectiles include metallic calcium and calcium alloys such as Ca-Si or Ca-Ba-Si alloy. Representative compositions for the calcium additive are shown by the following examples by weight:

| | | |
|---|---|---|
| i) | Ca | More than 40% |
| | Si | More than 40% |
| | Ba | Less than 20% |
| ii) | Ca | More than 40% |
| | Mg | More than 10% |
| | Si | Less than 10% |

Other ingredients: Coating material of a high molecular weight organic compound

|  |  |  |
| --- | --- | --- |
| iii) | Ca | More than 25% |
|  | Mg | More than 7% |
|  | Rare earth elements | More than 15% |
|  | Al | More than 20% |
|  | Si | More than 20% |
| iv) | Ca | 25 – 35% |
|  | Mg | 5 – 15% |
|  | Rare earth elements | 10 – 20% |
|  | Si | More than 10% |

Figure 4:
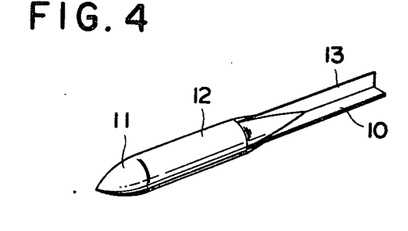
FIG. 4 shows a projectile according to this invention which is useful for introducing calcium into the molten steel.

FIG. 4 illustrates one embodiment of a projectile according to this invention. The projectile 10 consists of a tip 11 made of a metal such as iron having a higher density than the materials of the other portions, a middle portion 12 of the shell which is made of the above-mentioned materials and has the calcium additive contained therein, and a plurality of rudders 13 attached to the end portion of the cannon ball 10 for stabilizing the flight. As mentioned above, the tip portion 11 is preferably made of a material of a higher density to maintain the posture of the projectile 10 perpendicular to the surface of the molten steel when the projectile is shot from a launcher.

According to another embodiment of this invention, the addition of calcium is performed by continuously feading the calcium additive in the form of a wire at a velocity of 10 to 100 m/sec into molten steel in a ladle having a capacity of 25 to 300 tons. The wire of calcium additive according to this invention comprises a hollow cylindrical shell having an outer diameter of 5 to 100 mm, preferably 25 to 50 mm and has the calcium additive contained therein. The material of the hollow cylindrical shell and its thickness are the same as in the case of the calcium additive of the projectile type. For the same reasons as with the projectile type, the feeding velocity of the wire is limited to the range of 10 to 100 m/sec.

The following specific examples are included merely to aid in the understanding of the invention, and variations therefrom may be made by those skilled in the art without departing from the spirit and scope of the invention.

EXAMPLE 1

Aluminum killed steels having the chemical compositions shown in Table 1 were prepared for use as the material of high strength line pipe in arctic sites. Additions of Ca, Ti, Zr and Ce were made respectively to the steel in the molten state. The resulting steels were rolled to plate of 11 mm in thickness under the same low, temperature controlled condition.

Table 1

| Sample No. | Chemical composition, % by weight | | | | | | | | Additive | element incorporated after addition, % by weight |
| --- | --- | --- | --- | --- | --- | --- | --- | --- | --- | --- |
|  | C | Si | Mn | S | V | Nb | Al | Bal. |  |  |
| 1* | 0.05 | 0.35 | 1.25 | 0.005 | 0.075 | 0.015 | 0.029 | Fe | none | none |
| 2* | 0.05 | 0.37 | 1.27 | 0.005 | 0.08 | 0.024 | 0.030 | Fe | Ti | Ti: 0.06 |
| 3* | 0.048 | 0.38 | 1.29 | 0.005 | 0.08 | 0.027 | 0.043 | Fe | Ce | Ce: 0.034 |
| 4* | 0.049 | 0.37 | 1.32 | 0.005 | 0.075 | 0.024 | 0.047 | Fe | Ce | Ce: 0.070 |
| 5* | 0.05 | 0.35 | 1.26 | 0.005 | 0.085 | 0.019 | 0.036 | Fe | Zr | Zr: 0.10 |
| 6 | 0.048 | 0.33 | 1.45 | 0.005 | 0.08 | 0.027 | 0.034 | Fe | Ce-Ca | Ce: 0.010 Ca: 0.0030 |
| 7 | 0.058 | 0.34 | 1.29 | 0.005 | 0.07 | 0.027 | 0.030 | Fe | Ca | Ca: 0.0029 |
| 8 | 0.060 | 0.26 | 1.23 | 0.005 | 0.09 | 0.027 | 0.035 | Fe | Ca | Cu: 0.16 Cr: 0.16 Mo: 0.15 Ca: 0.0028 |

The mark * exhibits that the addition was made outside of the scope of this invention.

The mechanical properties of the rolled steel samples were determined and are shown in Table 2.

Table 2

| | Mechanical properties | | | | | |
| --- | --- | --- | --- | --- | --- | --- |
| | Tensile properties | | | Charpy properties across the rolled direction | | |
| Sample No. | Yield stress, kg/mm² | Tensile strength kg/mm² | Total elongation, % | 50% fracture transition temperature, °C | Shelf energy, kg.m | Absorption energy at −80° C kf.m |
| 1* | 51.2 | 56.7 | 34.0 | −90 | 14.9 | 4.5 |
| 2* | 55.7 | 61.2 | 28.0 | −48 | 15.7 | 0.9 |
| 3* | 53.3 | 58.8 | 33.0 | −82 | 11.3 | 3.4 |
| 4* | 53.4 | 58.0 | 34.0 | −65 | 12.3 | 1.4 |
| 5* | 52.4 | 57.4 | 33.0 | −57 | 12.0 | 0.9 |
| 6 | 56.5 | 59.2 | 33.0 | −107 | 21.3 | 11.6 |
| 7 | 54.5 | 58.8 | 35.0 | −120 | 22.8 | 13.1 |
| 8 | 53.3 | 61.3 | 35.2 | −92 | 21.5 | 14.0 |

As seen from Talbe 2, all of the steel samples exhibit mechanical properties generally exceeding the values required for the line pipe materials. Particularly, Sample Nos. 6 to 8 exhibit values of shelf energy about twice those of Sample Nos. 1 to 5. The fracture transition temperature for Sample Nos. 6 to 8 is also excellently low as compared with Sample Nos. 1 to 5. Namely, at a sulfur level of 0.05%, the addition of calcium according to this invention is prominently effective for the improvement of the absorption shelf energy characteristic which cannot be achieved by the conventional addition of elements, such as titanium, zirconium and cerium.

EXAMPLE 2

Samples of molten steel each having the chemical composition shown in Table 3 were prepared in a high frequency induction furnace and had a calcium additive added thereto. The resulting steel samples were rolled to 17 mm thickness under the same low, temperature controlled conditions.

Table 3

| Sample No. | S-level % | Chemical composition, % by weight | | | | | | | Amount of Ca-additive g/ton |
|---|---|---|---|---|---|---|---|---|---|
| | | C | Si | Mn | S | Nb | Al | Ce | |
| 9 | 0.005 | 0.11 | 0.33 | 1.29 | 0.005 | 0.024 | 0.025 | — | 150 |
| 10* | 0.005 | 0.11 | 0.33 | 1.32 | 0.005 | 0.022 | 0.034 | — | — |
| 11* | 0.005 | 0.10 | 0.31 | 1.31 | 0.005 | 0.024 | 0.035 | 0.015 | — |
| 12* | 0.005 | 0.10 | 0.35 | 1.32 | 0.006 | 0.019 | 0.044 | — | 80 |
| 13 | 0.007 | 0.09 | 0.29 | 1.40 | 0.007 | 0.025 | 0.041 | — | 150 |
| 14* | 0.007 | 0.10 | 0.32 | 1.37 | 0.007 | 0.021 | 0.030 | — | — |
| 15* | 0.010 | 0.11 | 0.30 | 1.26 | 0.011 | 0.018 | 0.033 | — | — |
| 16* | 0.010 | 0.10 | 0.31 | 1.33 | 0.010 | 0.022 | 0.035 | 0.025 | — |
| 17* | 0.010 | 0.09 | 0.34 | 1.32 | 0.010 | 0.021 | 0.034 | — | 80 |
| 18* | 0.010 | 0.10 | 0.35 | 1.30 | 0.011 | 0.019 | 0.030 | — | 150 |
| 19* | 0.015 | 0.10 | 0.29 | 1.30 | 0.016 | 0.024 | 0.025 | — | — |
| 20* | 0.015 | 0.11 | 0.30 | 1.28 | 0.016 | 0.022 | 0.028 | — | 150 |

The mark * exhibits the control sample which was tested in order to determine the standards for evaluating the effect of this invention. Although there is no indication of the total oxygen content of the steel samples, all of the samples were aluminum killed steel and the total oxygen content thereof was less than 100 ppm.

The mechanical properties of the rolled steel samples are shown in Table 4.

Table 4

| | Mechanical properties | | | | | |
|---|---|---|---|---|---|---|
| | Tensile properties | | | Charpy properties across the rolled direction | | |
| Sample No. | Yield stress, kg/mm² | Tensile strength kg/mm² | Total elongation, % | 50% fraction transition temperature, °C | Shelf energy, kg.m | Absorption energy at −80° C kg.m |
| 9 | 47.8 | 56.4 | 40.0 | −100 | 19.2 | 12.4 |
| 10* | 48.7 | 56.6 | 38.0 | −81 | 10.5 | 3.2 |
| 11* | 47.9 | 57.0 | 39.0 | −79 | 11.0 | 2.5 |
| 12* | 48.6 | 56.9 | 38.0 | −83 | 10.0 | 3.3 |
| 13 | 49.2 | 56.4 | 39.0 | −103 | 17.8 | 12.3 |
| 14* | 49.2 | 57.8 | 37.5 | −84 | 9.2 | 3.2 |
| 15* | 46.3 | 57.1 | 35.0 | −85 | 7.2 | 3.0 |
| 16* | 47.2 | 56.6 | 36.0 | −86 | 11.2 | 3.3 |
| 17* | 48.3 | 57.1 | 35.5 | −78 | 7.9 | 1.7 |
| 18* | 48.6 | 57.4 | 36.0 | −88 | 10.6 | 3.8 |
| 19* | 47.3 | 55.9 | 33.0 | −80 | 5.1 | 1.8 |
| 20* | 47.2 | 56.1 | 33.5 | −83 | 7.2 | 3.2 |

As may be readily seen from Table 4, the addition of calcium according to this invention (Sample Nos. 9 and 13) remarkably improved the impact characteristics. At the same sulfur level of 0.005% by weight, Sample No. 9 exhibited a larger absorption energy at −80° C than did Sample No. 12. Namely, the addition of calcium in a net amount of less than 100 g/ton of steel did not improve the impact properties across the rolling direction. At a sulfur level of 0.010%, the addition of calcium in a net amount of higher than 100 g/ton of steel (Sample No. 18) was less effective than a cerium addition (Sample No. 16).

EXAMPLE 3

Steel samples were prepared each having the chemical composition as shown in Table 5. Calcium was added to Sample Nos. 21 and 25, and cerium was added to Sample No. 24. Thereafter, each of the samples was hot rolled at a finishing temperature of 800° C and a coiling temperature of 570° C, thereby obtaining a steel sheet of 6.0 mm thickness.

Table 5

| Sample No. | Chemical composition, % by weight | | | | | | Addition |
|---|---|---|---|---|---|---|---|
| | C | Si | Mn | S | Nb | Al | |
| 21 | 0.10 | 0.22 | 1.26 | 0.004 | 0.037 | 0.021 | Ca: in 150 g/ton |
| 22* | 0.11 | 0.29 | 1.25 | 0.004 | 0.030 | 0.029 | none |
| 23* | 0.11 | 0.25 | 1.25 | 0.013 | 0.031 | 0.039 | none |
| 24* | 0.11 | 0.26 | 0.21 | 0.011 | 0.027 | 0.045 | 0.026% incorporated after the addition |
| 25* | 0.10 | 0.25 | 1.32 | 0.011 | 0.047 | 0.014 | Ca: in 150 g/ton |

The mark * signifies the control samples.

The following Table 6 shows the mechanical properties of the resulting sheets, which properties were determined across the rolling direction.

Table 6

| | Mechanical properties | | | | | |
|---|---|---|---|---|---|---|
| | Tensile properties | | | | Charpy properties across the rolled direction | |
| Sample No. | Yield stress, kg/mm² | Tensile strength, kg/mm² | Total elongation, % | Notch elongation, % | 50% fracture transition temperature, °C | Absorption energy at °C, kg.m |
| 21 | 49.9 | 58.5 | 32.0 | 22.1 | −92 | 9.2 |

Table 6-continued

| | Mechanical properties | | | | | |
|---|---|---|---|---|---|---|
| | Tensile properties | | | | Charpy properties across the rolled direction | |
| Sample No. | Yield stress, kg/mm² | Tensile strength, kg/mm² | Total elongation, % | Notch elongation, % | 50% fracture transition temperature, °C | Absorption energy at °C, kg.m |
| 22* | 46.8 | 56.5 | 32.0 | 20.2 | −73 | 5.9 |
| 23* | 52.2 | 60.5 | 28.5 | 8.0 | −70 | 2.2 |
| 24* | 48.5 | 57.6 | 30.5 | 16.4 | −77 | 4.8 |
| 25* | 49.4 | 58.9 | 30.0 | 15.8 | −75 | 4.1 |

Charpy tests were conducted by means of half sub-sized test pieces. Notch elongation tests were conducted using test pieces of the same shape as the test pieces for the tensile test according to JIS No. 5 and cut with V-notches of 1 mm on the both sides of the center. The gauge length of the notch elongation test was 25 mm.

As seen from Table 6, remarkable improvements in notch elongation and charpy properties were achieved by the addition of calcium according to this invention.

EXAMPLE 4

Molten steel was prepared having a chemical composition of, by weight, carbon 0.05%, silicon 0.33%, Manganese 1.46%, phosphorus 0.016%, sulfur 0.005%, copper 0.006%, chromium 0.02%, niobium 0.023%, soluble aluminum 0.038% and the balance being iron. The samples of this molten steel were respectively maintained at various temperatures as shown in Table 7 and had calcium added thereto by means of projectiles under the following conditions:
Calcium additive; metallic calcium
Size of the additive; 40 mm in outer diameter and 250 mm in length
Initial velocity; 50 m/sec
Net amount of added Ca; 200 g/ton of steel
Calcium content of the steel after the addition; 0.0031% by weight
Ca/S ratio of the steel after the addition; 0.6
Microcleanliness tests for nonmetallic inclusions in the resulting steel were conducted in accordance with JIS and the results obtained are shown in Table 7.

At temperatures of molten steel below 1480° C, the effect of the addition of calcium is too fluctuant to put the calcium addition into practice.

EXAMPLE 5

Samples were prepared from molten steel consisting of, by weight, carbon 0.09%, silicon 0.28%, molybdenum 1.30%, phosphorus 0.017%, sulfur 0.006%, copper 0.02%, uranium 0.03%, soluble aluminum 0.041% and the balance being iron. Samples of the molten steel were respectively maintained at the temperatures shown in Table 8 and the addition of calcium was conducted by feeding into the samples a wire of a calcium additive under the following conditions:
Ca-ingredient: Ca alloy consisting of Ca 33%, Si 50% and the balance Fe.
Size of wire: 35 mm in diameter
Feeding velocity of wire: 35 m/sec
Net amount of added Ca: 250 g/ton of steel
Ca/S ratio of the steel after the addition: 0.5 ~ 1.5
Microcleanliness tests for nonmetalic inclusions in the resulting steel were conducted on each sample in accordance with the method of JIS and the results are shown in Table 8.

Table 8

| Sample No. | Temperature of molten steel at the time of Ca-addition | Cleanliness degree d (%) | |
|---|---|---|---|
| 30 | Below 1480° C | 0.090 ~ 0.225 | with large deviation |
| 31 | 1480 ~ 1600° C | 0.050 ~ 0.115 | Fair |
| 32 | 1600 ~ 1700° C | 0.018 ~ 0.060 | Good |
| 33 | 1700 ~ 1800° C | 0.025 ~ 0.080 | Fair |

EXAMPLE 6

Samples of molten steel were prepared each having a chemical composition as shown in Table 9. Some of the samples were subjected to vacuum degassing by the DH method under the conditions shown in Table 10 thereby reducing the active oxygen content $a_o$ to less than 1 ppm. The active oxygen content in the molten steel was determined by an oxygen probe in accordance with the solid zirconia electrode method.

Table 7

| Sample No. | Temperature of molten steel at the time of Ca-addition | Cleanliness degree d(%) | | Steel without the addition |
|---|---|---|---|---|
| | | Steel added with Ca | | |
| 26 | lower than 1480° C | 0.090–0.225, | with large deviation | 0.090 – 0.185 |
| 27 | 1480 ~ 1600° C | 0.050–0.115, | Fair | 0.065 – 0.150 |
| 28 | 1600 ~ 1700° C | 0.018~0.060, | Good | 0.025 ~ 0.090 |
| 29 | 1700 ~ 1800° C | 0.025~0.080, | Fair | 0.025 ~ 0.120 |

Table 9

| | Chemical composition of the molten steel | | | | | | | | | |
|---|---|---|---|---|---|---|---|---|---|---|
| | C | Si | Mn | P | S | Cu | Cr | Nb | Sol.Al | O($a_o$)ppm |
| Before vacuum degassing | 0.08 | 0.05 | 0.60 | 0.015 | 0.006 | 0.02 | 0.02 | Trace | Trace | 70 |
| After vacuum degassing | 0.06 | 0.30 | 1.35 | 0.019 | 0.006 | 0.02 | 0.03 | 0.024 | Trace | trace |

Table 10

| Conditions of the vacuum degassing | |
|---|---|
| Temperature of the molten steel before vacuum degassing | 1670° C |
| Temperature of the molten steel after vacuum degassing | 1635° C |
| Degree of vacuum finally achieved | 0.2 mm Hg |
| Mean amount of sucked steel per stroke | 13.3 tons |
| Number of times of suction | 43 times |
| Ratio of sucked steel amount to the whole amount | 3.3 |

During the vacuum degassing, the samples of molten steel had the following alloys added thereto:
Low-carbon Si-Mn alloy—10 kg/ton
Low-carbon Fe-Mn alloy:—3 kg/ton
Fe-Nb:—0.4 kg/ton Thereafter, samples of the molten steel had calcium added to them under the following conditions:
Ca additive, projectile comprising a shell of iron with a calcuim element contained therein.
Initial velocity; 50 m/sec
Net amount of added Ca; 270 g/ton of steel The mechanical properties of each samples are shown in Table 11.

Table 11

| Sample No. | Mechanical properties | | | | | |
|---|---|---|---|---|---|---|
| | Chemical composition | | | | | |
| | $a_o$(ppm) | C(%) | Mn(%) | S(%) | Sol.Al(%) | Ca(ppm) |
| 34. Ca-addition after vacuum degassing | Trace | 0.08 | 1.35 | 0.006 | Trace | 25 |
| 35. Ca-addition after vacuum degassing | Trace | 0.07 | 1.41 | 0.006 | Trace | 18 |
| 36. Ca-addition without vacuum degassing | 8 | 0.07 | 1.37 | 0.006 | Trace | 5 |
| 37. No Ca-addition | 21 | 0.07 | 1.38 | 0.005 | 0.038 | Trace |

| Sample No. | Absorption energy at −40° C measured by 2 mmV full sized Charpy test, kg.m | | | |
|---|---|---|---|---|
| | VE-40 (L) | VE-40 (C) | $VE_c(Z)$ | $VT_s(C)$ |
| 34 | 30 | 30 | 12.7 | − 115° C |
| 35 | 30 | 30 | 10.8 | − 105° C |
| 36 | 28.3 | 22.5 | 2.3 | − 60° C |
| 37 | 26.0 | 11.8 | 0.8 | − 55° C |

The symbol "$a_o$" exhibits the amount of active oxygen in the steel. In the impact tests, L was determined along the rolling direction, C across the rolling direction and Z along the direction perpendicular to the rolled surface.

From these results, it can be seen that the low temperature impact characteristics were markedly improved in Sample Nos. 34 and 35 wherein the vacuum degassing had been performed before the addition of calcium as compared with Sample Nos. 36 and 37 wherein vacuum degassing had not been performed. Thus the vacuum degassing enhanced the effectiveness of the addition of calcium.

EXAMPLE 7

A ladle was charged with molten steel having a chemical composition of carbon-0.08%, silicon-0.30%, manganese-1.41%, phosphorous-0.018%, sulfur-0.008%, copper-0.02%, chromium-0.03%, niobium-0.023%, vanadium-0.06T, soluble aluminum-0.027%, the balance being iron. The molten steel was stirred by blowing argon gas therethrough for 20, 30, 40 or 50 minutes under the following conditions:
Blowing pressure: 3.5 kg/cm²
Flow rate of argon: 35 Nm³/hr Thereafter, the calcium addition was made to the steel samples which had been subjected to the gas bubbling under the above conditions and to a steel sample which had not been subjected thereto.

CONDITIONS OF Ca-ADDITION

Additive: projectile
Temperature of molten steel: 1630° C
Initial velocity: 50 m/sec
Net amount of added Ca: 270 g/ton of steel
Ratio of Ca/S: 0.33

The mechanical properties and cleanliness of the resulting steel samples are shown in Table 12.

Table 12

| Sample No. | Duration time of gas blowing (min) | Yield index of Ca-addition | Cleanliness index | Low temperature impact property |
|---|---|---|---|---|
| 38 | 0 | 0.5 | 0.7 | 0.7 |
| 39 | 20 | 0.8 | 0.9 | 0.8 |
| 40 | 30 | 0.95 | 1.0 | 0.85 |
| 41 | 40 | 1.0 | 1.0 | 1.0 |
| 42 | 50 | 1.0 | 1.0 | 1.0 |

Note 1: "Yield index of Ca-addition" is represented by a ratio of the yield of added calcium of a particular sample to the maximum yield of added calcium in the present Example.
Note 2: "Cleanliness index" is represented by a ratio of the cleanliness of a particular sample to the maximum cleanliness in the present Example.
Note 3: "Low temperature impact property" is represented by a ratio of the value of absorption energy in the C-direction at −40° C for 2 mm V-notched specimen of a particular sample to a value of 30 kg.m.

It may be readily seen from Table 12 that the yield and effectiveness of the calcium addition are remarkably enhanced by the gas bubbling.

EXAMPLE 8

Molten steel was prepared having a chemical composition of by weight, carbon-0.07 to 0.09%, silicon-0.28 to 0.33%, manganese-1.33 to 1.41%, phosphorus-0.011 to 0.023%, sulfur-0.004 to 0.007%, niobium-0.020 to 0.021%, copper-0.02%, chromium-0.02 to 0.03%, soluble aluminum-0.018 to 0.045% and the balance being iron.

In addition, artificial slag having a composition of lime-45%, magnesia-7%, alumnia-20%, silica-35 and calcium fluoride-25% was put in a ladle in an amount of 5.0, 10.0, 20.0 or 30 kg/ton of steel. Thereafter, the ladle was charged with molten steel of the above composition and the calcium was added thereto under the same conditions. Table 13 shows the yield from the calcium addition, the cleanliness degree and the impact property of the resulting steel.

Table 13

| Sample No. | Amount of the artificial slag (kg/ton of steel) | Yield index of Ca-addition | Cleanliness degree of the steel (%) | Low temperature impact property at 0° C |
|---|---|---|---|---|
| 43 | 0 | 0.5 | 0.055 | 0.7 |
| 44 | 5.0 | 0.7 | 0.045 | 0.85 |
| 45 | 10.0 | 0.8 | 0.038 | 0.95 |
| 46 | 20.0 | 1.0 | 0.027 | 1.00 |
| 47 | 30.0 | 1.0 | 0.030 | 1.00 |

Note:
"The yield index of Ca-addition" is represented by a ratio of the yield of a particular sample to a maximum value of the yield from the addition of calcium in this Example. The low temperature impact property is represented by a ratio of the absorption energy in C-direction for a full sized specimen of a particular sample to the maximum value achieved in this Example.

What is claimed is:

1. A process for producing steel having improved low temperature impact characteristics comprising the steps of
   forming a molten steel having the following quantities of elements present therein as expressed in weight percent unless otherwise specified:

| Carbon | 0.02 to 0.55 |
|---|---|
| Silicon | Less than 0.50 |
| Manganese | 0.20 to 2.50 |
| Sulfur | Less than 0.01 |
| Oxygen | Less than 100 ppm | maintaining the molten steel at a temperature in the range between 1480° and 1800° C,
   adding calcium to the molten steel in an amount of 0.1 to 2.0 kg per ton of molten steel to establish a calcium content in the molten steel whose ratio to the sulfur content therein is in the range of 0.05 to 0.8, the calcium being added in a form selected from the group consisting of metallic calcium and alloys thereof, and
   recovering steel having improved low temperature impact characteristics.

2. A process according to claim 1, wherein the sulfur content of the molten steel is less than 0.007 weight percent.

3. A process according to claim 2, wherein said molten steel prior to the addition of calcium consists essentially of, by weight:

| C: | 0.02 – 0.55% |
|---|---|
| Si: | Less than 0.50% |
| Mn: | 0.20 – 2.50% |
| Cu: | 0 – 0.50% |
| Cr: | 0 – 1.50% |
| M0: | 0 – 0.50% |
| Ni: | 0 – 10% |
| Nb: | 0 – 0.050% |
| V: | 0 – 0.1% |
| Ti: | 0 – 0.05% | the balance being Fe except for inevitable amounts of impurities.

4. A process according to claim 1, wherein there is further included the step of aluminum killing the molten steel prior to addition of calcium so that soluble aluminum is contained in the melt in an amount ranging from 0.005 to 0.085 weight percent.

5. A process according to claim 1, wherein there is further included, prior to addition of calcium, the step of subjecting said molten steel to inactive gas bubbling in a ladle sufficiently to float and separate contaminants from the molten steel.

6. A process according to claim 5, wherein the ladle has a capacity of from 25 to 300 tons of molten steel and the gas bubbling occurs under the following conditions:
   Duration: 20 to 40 minutes
   Blowing pressure of inert gas: 2.5 to 5.0 kg/cm³
   Flow rate of inert gas: 10 to 80 Nm³/hr.

7. A process according to claim 1, wherein there is further included the step of, in advance of the addition of calcium, modifying the chemical properties of slag on the molten steel by adding to the molten steel an artificial slag in an amount ranging from 5.0 to 20.0 kg/ton of the molten steel, the artificial slag consisting of, by weight:

| CaO: | 40 to 60% |
|---|---|
| MgO: | 7 to 9% |
| Al₂O₃: | 15 to 25% |
| SiO₂: | 3 to 5% |
| CaF₂: | 20 to 30%. |

8. A process according to claim 7, wherein the artificial slag has the following size distribution:

| Larger than 8 mesh | 3 – 17% |
|---|---|
| 8 – 12 mesh | 10 – 16% |
| 12 – 20 mesh | 15 – 20% |
| 20 – 32 mesh | 11 – 22% |
| 32 – 48 mesh | 10 – 30% |
| 48 – 60 mesh | 2 – 5% |
| 60 – 100 mesh | 6 – 8% |
| 100 – 150 mesh | 1 – 5% |
| 150 – 200 mesh | Less than 3% |
| Smaller than 200 mesh | Less than 11%. |

9. A process according to claim 1, where there is further included the step of, in advance of the addition of calcium, modifying the chemical properties of slag on the molten steel by adding to the molten steel an artificial slag in an amount ranging from 5.0 to 20.0 kg/ton of the molten steel, the artificial slag consisting of, by weight:

| CaO: | 55 to 70% |
|---|---|
| Al₂O₃: | 10 to 25% |
| CaF₂: | 3 to 14%. |

10. A process according to claim 9, wherein the artificial slag has the following size distribution:

| | |
|---|---|
| Larger than 8 mesh | 3 – 17% |
| 8 – 12 mesh | 10 – 16% |
| 12 – 20 mesh | 15 – 20% |
| 20 – 32 mesh | 11 – 22% |
| 32 – 48 mesh | 10 – 30% |
| 48 – 60 mesh | 2 – 5% |
| 60 – 100 mesh | 6 – 8% |
| 100 – 150 mesh | 1 – 5% |
| 150 – 200 mesh | Less than 3% |
| Smaller than 200 mesh | Less than 11%. |

11. A process according to claim 1, wherein there is further included the step of, in advance of the addition of calcium, subjecting the molten steel to a vacuum degassing process to thereby decrease the total oxygen content of the molten steel to less than 10 ppm.

12. A process according to claim 11, wherein the vacuum degassing process is conducted by DH method under the following conditions:
Degree of vacuum finally achieved in a vacuum degasser: less than 0.5 mm Hg
Ratio of the amount of circulated molten steel to the whole amount of molten steel to be treated: higher than 1.5.

13. A process according to claim 1, wherein the addition of calcium is achieved by shooting projectiles including the calcium into the molten steel, the initial velocity of the projectiles being sufficient to penetrate into the molten steel, but less than that initial velocity necessary to totally traverse the molten steel.

14. A process according to claim 13, wherein the molten steel is contained in a ladle having a capacity of 25 to 300 tons and a depth of 1.0 to 7.0 meters, each projectile being 5 to 100 mm diameter, and 100 to 800 mm in length and the initial velocity of the projectiles is in the range from 20 to 100 m/sec.

15. A process according to claim 14 wherein the depth of the molten steel in the ladle is in the range from 3 to 4 meters and the projectile diameter is in the range of from 25 to 50 mm.

16. A process according to claim 1, wherein the addition of calcium is achieved by continuously feeding a wire including the calcium at a feeding velocity sufficient to penetrate into the molten steel, but less than that feeding velocity necessary to totally traverse the molten steel before melting.

17. A process according to claim 16, wherein the molten steel is contained in a ladle having a capacity ranging from 25 to 300 tons and a depth of 1.0 to 7.0 meters, the wire being 5 to 100 mm in diameter and the feeding velocity being in the range from 10 to 100 m/sec.

18. A process according to claim 1, wherein the calcium is added as an alloy of calcium and silicon.

19. A process according to claim 1, wherein the calcium is added as an alloy of calcium, barium and silicon.

20. A process according to claim 19, wherein the alloy has the following composition:

| | |
|---|---|
| Calcium: | Greater than 40 weight percent |
| Silicon: | Greater than 40 weight percent |
| Barium: | Less than 20 weight percent |

21. A process according to claim 1, wherein the calcium is added as an alloy of the following composition:

| | |
|---|---|
| Calcium: | Greater than 40 weight percent |
| Magnesium: | Greater than 10 weight percent |
| Silicon: | Less than 10 weight percent |

22. A process according to claim 1, wherein the calcium is added as an alloy of the following composition:

| | |
|---|---|
| Calcium: | Greater than 25 weight percent |
| Magnesium: | Greater than 7 weight percent |
| Rare earth elements: | Greater than 15 weight percent |
| Aluminum | Greater than 20 weight percent |
| Silicon: | Greater than 20 weight percent |

23. A process according to claim 1, wherein the calcium is added as an alloy of the following composition

| | |
|---|---|
| Calcium: | 25 to 35 weight percent |
| Magnesium: | 5 to 15 weight percent |
| Silicon: | Greater than 10 weight percent |
| Rare earth elements: | 10 to 20 weight percent |

* * * * *